(12) United States Patent
Postelnicu et al.

(10) Patent No.: US 9,052,986 B1
(45) Date of Patent: Jun. 9, 2015

(54) PITCH SHIFT RESISTANT AUDIO MATCHING

(75) Inventors: Gheorghe Postelnicu, Zurich (CH); Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 489 days.

(21) Appl. No.: 13/450,422

(22) Filed: Apr. 18, 2012

(51) Int. Cl.
*G06F 17/00* (2006.01)

(52) U.S. Cl.
CPC .................................... *G06F 17/00* (2013.01)

(58) Field of Classification Search
CPC .............. G06F 17/30743; G06F 17/30017; G06K 9/0055; G06K 9/00711; G10L 15/10; G10L 25/18
USPC .................................................. 704/E19.009
See application file for complete search history.

(56) References Cited

U.S. PATENT DOCUMENTS

| | | | |
|---|---|---|---|
| 2004/0260682 A1* | 12/2004 | Herley et al. | 707/3 |
| 2005/0065976 A1* | 3/2005 | Holm et al. | 707/104.1 |
| 2006/0122839 A1* | 6/2006 | Wang et al. | 704/273 |
| 2011/0307085 A1* | 12/2011 | Selby et al. | 700/94 |

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed Jul. 11, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

\* cited by examiner

*Primary Examiner* — Curtis Kuntz
*Assistant Examiner* — Thomas Maung
(74) *Attorney, Agent, or Firm* — Amin, Turocy & Watson, LLP

(57) ABSTRACT

Systems and methods are provided herein relating to audio matching. Both melody fingerprints and audio-id fingerprints can be used to improve an audio matching system's resistance to pitch shifts. A melody fingerprint can be used to identify a set of potential melody matches. Varying pitch shifted audio-id reference fingerprints can be generated for audio-id fingerprints associated with the potential matches identified in melody matching. Additional pitch shifted audio-id fingerprints of a reference sample are generated and used in matching only if an audio sample has previously been matched to a melody fingerprint of the same reference sample. A reference index need not be expanded to include pitch shifted variations of each reference sample as pitch shifted variations of audio-id fingerprint reference samples are generated and used only if their associated melody fingerprint is deemed a potential match.

15 Claims, 14 Drawing Sheets

US 9,052,986 B1

PITCH SHIFT RESISTANT AUDIO MATCHING

TECHNICAL FIELD

This application relates to audio matching, and more particularly to pitch shift resistant audio matching of video clips.

BACKGROUND

Audio matching provides for identification of a recorded audio sample by comparing an audio sample to a set of reference samples. One example of a recorded audio sample can be an audio track of a video. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Fingerprints can be computed as functions of sets of interest points. Fingerprints of the audio sample can then be compared to fingerprints of reference samples to determine the identity of the audio sample.

Different types of fingerprints can be used for audio matching. For example, a melody fingerprint can be generated by incorporating interest points of an audio sample related to musical composition. In contrast, audio-id fingerprints can be generated by incorporating interest points of an audio sample related to every aspect of the audio sample to aid in identifying the exact same sound recording. Because audio-id is designed for high precision and exactness, audio matching using solely audio-id fingerprints can fail to identify pitch-shifted audio samples of a reference as the reference. In a media sharing service, the media sharing platform is reliant on users to provide uploaded content. In general, the media sharing service provider has little control over what content users can upload into the system, beyond limiting acceptable file formats, for example. An audio matching system that has no control over the content that it is to match benefits from being resistant to pitch-shifted content uploaded by users. Therefore there exists a need to improve audio-id matching to be more resistant to pitch-shifting.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. An input component can receive a video sample. A fingerprint component can generate a melody fingerprint and an audio-id fingerprint based on an audio track of the video sample. A melody matching component can identify a set of potential melody matches based on comparing the melody fingerprint to a set of reference melody fingerprints. An audio-id matching component can identify a set of potential audio-id matches based on comparing the audio-id fingerprint to a set of reference audio-id fingerprints associated with the set of potential melody matches.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
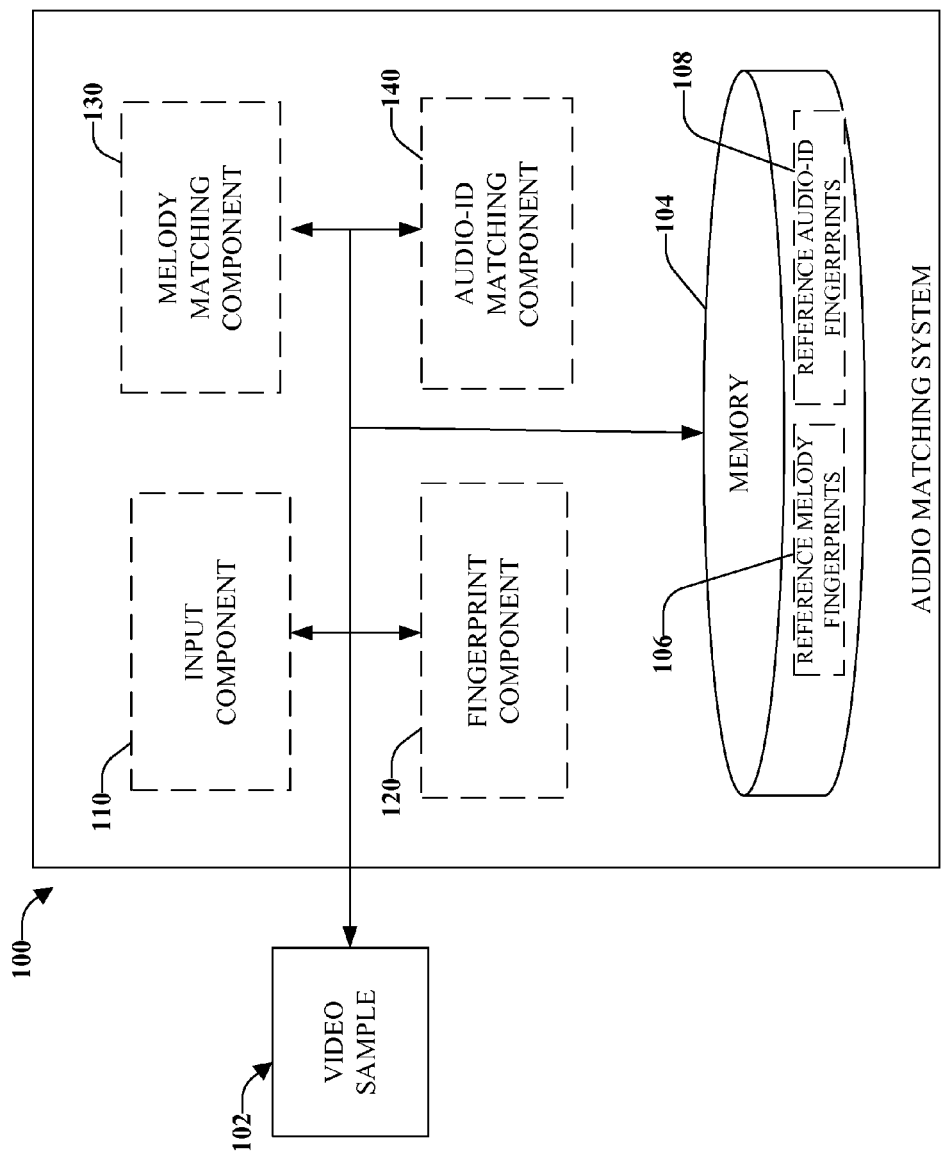
FIG. 1 illustrates a high-level functional block diagram of an example pitch shift resistant audio matching system in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Audio matching in general involves analyzing an audio sample, for example, an audio track of a video sample, for unique characteristics that can be used in comparison to unique characteristics of reference samples to identify the audio sample. As a starting point for this analysis, a spectrogram of the audio signal can be constructed. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can use large amounts of storage space and affect scalability of an audio matching system. Therefore, it can be desirable to instead calculate and store compact fingerprints of reference samples versus an entire spectrogram. One method of calculating fingerprints is to first determine individual interest points that identify unique characteristics of local features of the time-frequency representation of the reference sample. Fingerprints can then be computed as functions of sets of interest points.

Calculating interest points involves identifying unique characteristics of the spectrogram. Different interest point detection algorithms can be used to generate different types of fingerprints. For example, a melody fingerprint can be generated by incorporating interest points of an audio sample related to musical composition. Using a melody fingerprint, matching a live performance of a song with a studio performance of the same song is possible, as the musical composition for both should be the same. Thus, voice imperfections or other noise from the live performance should not prevent matching the live performance with the studio performance.

In contrast, audio-id fingerprints can be generated by incorporating interest points of audio sample related to every aspect of the audio sample to aid in identifying the exact same sound recording. Using an audio-id fingerprint, matching a live performance of a song with a studio performance of the same song is unlikely, as although the musical composition for both should be the same, minor voice inflections or added background noise can cause an exact match to fail. In addition to possibly failing to match two different recordings of the same song, audio-id fingerprints can also be susceptible to pitch shift distortions interfering with a potential match. For example, popular encoding codecs such as AAC, MP3, FLAC, etc., can cause subtle changes, such as pitch shifts, to the underlying audio sample during encoding. These subtle changes can then prevent an encoded audio sample from matching a decoded or differently encoded version of the same audio sample if the sole mechanism for the audio matching is audio-id as implemented in conventional systems. Because audio-id is designed for high precision and exactness, audio matching using solely audio-id fingerprints can fail to identify pitch-shifted audio samples of a reference as the reference.

One way to make audio-id matching more resistant to pitch shifts is to generate multiple audio-id fingerprints for individual reference samples with different audio-id fingerprints corresponding to different degrees of pitch shifts. For example, each reference sample in a reference sample database can have a clean, e.g., non pitch shifted, fingerprint, and different fingerprints associated with different pitches of the clean reference sample. Storing and using multiple fingerprints for each reference sample in a database including millions or billions of reference samples can create scalability difficulties related to storage and matching efficiency in such a large scale system. Implementations of systems and methods disclosed herein provide for generating and comparing pitch shifted audio-id fingerprints of reference samples only after using melody fingerprints and melody fingerprint matching to filter potential matching audio-id reference samples.

Systems and methods herein provide for generating both melody fingerprints and audio-id fingerprints and using both to improve an audio matching system's resistance to pitch shifts. Both a melody fingerprint and an audio-id fingerprint can be generated based on an audio sample. First, a melody fingerprint can be used to identify a set of potential melody matches based on performing a lookup of the melody fingerprint against a set of reference melody fingerprints. The set of reference melody fingerprints can contains millions of reference melody fingerprints.

With a set of potential melody fingerprint matches identified, audio-id fingerprints associated with the set of potential melody matches can be used in comparing an audio-id fingerprint of the audio sample. The compare can be a pairwise operation, or a one to few operation, where a comparison of the audio-id fingerprint is made with a few, for example 1 to 100, fingerprints. A separate index can be computed for the 1 to 100 comparison fingerprints on an ad hoc basis, with the index containing only the few references used in the compare operation. In one implementation, varying pitch shifted audio-id reference fingerprints can be generated for potential matches identified in melody matching. Thus, additional pitch shifted audio-id fingerprints of a reference sample are generated and used in the compare only if an audio sample has previously been matched to a melody fingerprint of the same reference sample. In this sense, the separate ad-hoc index can include pitch shifted audio-id fingerprint variations of each reference sample identified in the melody lookup. It can be appreciated that, in an exemplary implementation, pitch shifted variations of audio-id fingerprint reference samples are generated and used only if their associated melody fingerprint is deemed a potential match to an audio sample based on the melody fingerprint lookup.

Referring to FIG. 1, there is illustrated a high-level functional block diagram of an example pitch shift resistant audio matching system in accordance with implementations of this disclosure. In FIG. 1, an audio matching system 100 includes an input component 110, a fingerprint component 120, a melody matching component 130, an audio-id matching component, and a memory 104, each of which may be coupled as illustrated. An input component 110 can receive a video sample 102. For example, video sample 102 could be an upload made by a user of a media sharing platform. It can be appreciated that video sample 102 could be in any recognizable video file format, codec compression format, etc. A fingerprint component 120 can generate a melody fingerprint and an audio-id fingerprint based on an audio track of the video sample. It can be appreciated that the melody fingerprint and audio-id fingerprint can be generated concurrently or consecutively, in either order, by fingerprint component 120.

A melody matching component 130 can identify a set of potential melody matches based on comparing the melody fingerprint to a set of reference melody fingerprints 106. For example, reference melody fingerprints 106 can be a set of reference melody fingerprints previously generated and indexed based on a set of reference samples. It is to be appreciated that reference melody fingerprints 106 can be indexed in variety of available formats, such as using a hash index, allowing for efficient use by melody matching component 130 in identifying a set of potential melody matches.

An audio-id matching component 140 can identify a set of potential audio-id matches based on comparing the audio-id fingerprint to a set of reference audio-id fingerprints 108 associated with the set of potential melody matches. For example, reference audio-id fingerprints 108 can be a set of reference audio-id fingerprints previously generated and indexed based on a set of reference samples. Reference audio-id fingerprints 108 can be associated with corresponding reference melody fingerprints 106 associated with the same reference sample. Thus, the set of potential melody matches identified by melody matching component 130 can be associated with a set of audio-id fingerprints based on the same underlying reference samples. It is to be appreciated that reference audio-id fingerprints 108 can be indexed in variety of available formats, such as using a hash index, allowing for efficient use by audio-id matching component 140 in identifying a set of potential audio-id matches. It is to be further appreciated that the reference audio-id fingerprint index can be an ad hoc index established and used for matching purposes but not permanently retained by system 100.

Figure 2:
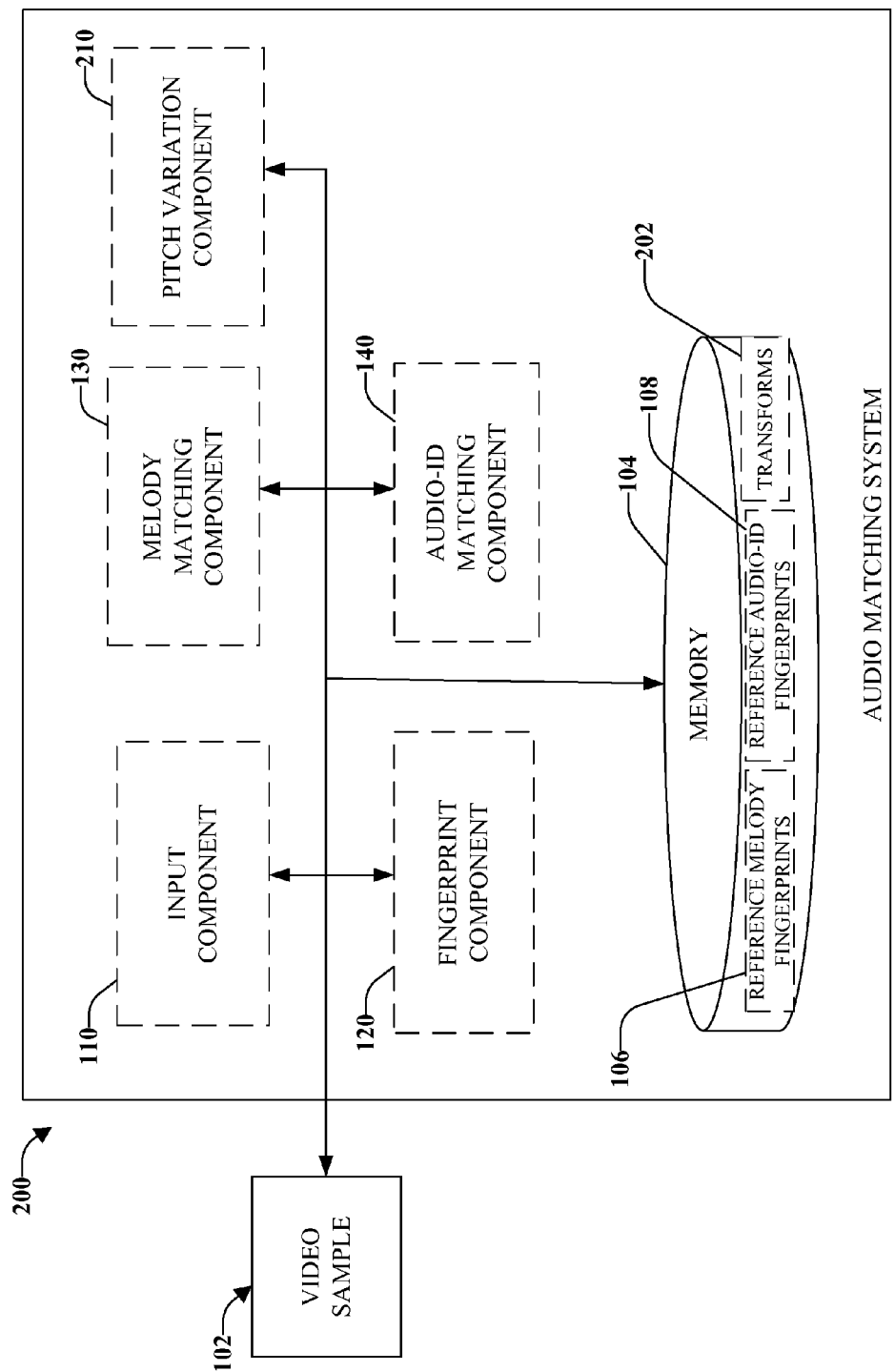
FIG. 2 illustrates a high-level functional block diagram of an example pitch shift resistant audio matching system including a pitch variation component in accordance with implementations of this disclosure.

Referring to FIG. 2, there is illustrated a high-level functional block diagram of an example pitch shift resistant audio matching system including a pitch variation component 210 in accordance with implementations of this disclosure. Pitch variation component 210 can generate at least one pitch modified fingerprint based on a reference audio-id fingerprint associated with a potential melody match in the set of potential melody matches and include the at least one pitch modified fingerprint within the set of reference audio-id fingerprints associated with the set of potential melody matches. Pitch variation component 210 can utilize transforms 202 in generating the at least one pitch modified fingerprint. For example, transforms 202 can include transforms that can induce varying degrees of pitch shifts on to a reference audio-id fingerprint generating a pitch modified fingerprint. A potential melody match in the set of potential melody matches, and associated audio-id fingerprints in the set of reference audio-id fingerprints 108, can be identified. Pitch variation component 210 can generate at least one pitch modified fingerprint based on the reference audio-id fingerprint and a transform in the set of transforms 202.

In one implementation, pitch variation component 210 can generate the at least one pitch modified fingerprint based on a pitch shift resistance threshold associated with the reference audio-id fingerprint. For example, if an audio-id fingerprint has an intrinsic resistance to pitch shift, e.g., pitch shift resistance threshold, of 2% and the system is designed to be robust to pitch shift transforms of up to 4% in either direction, the at least one pitch shift modified fingerprint can be one fingerprint at −3% pitch shift and another at +3% pitch shift. It is to be appreciated that the pitch shift resistance threshold can be adjusted over time. In one implementation, pitch shift resistance can be adjusted for individual reference samples that are known to be affected or show higher or lower propensities to be affected by pitch shifts during audio matching.

Figure 3:
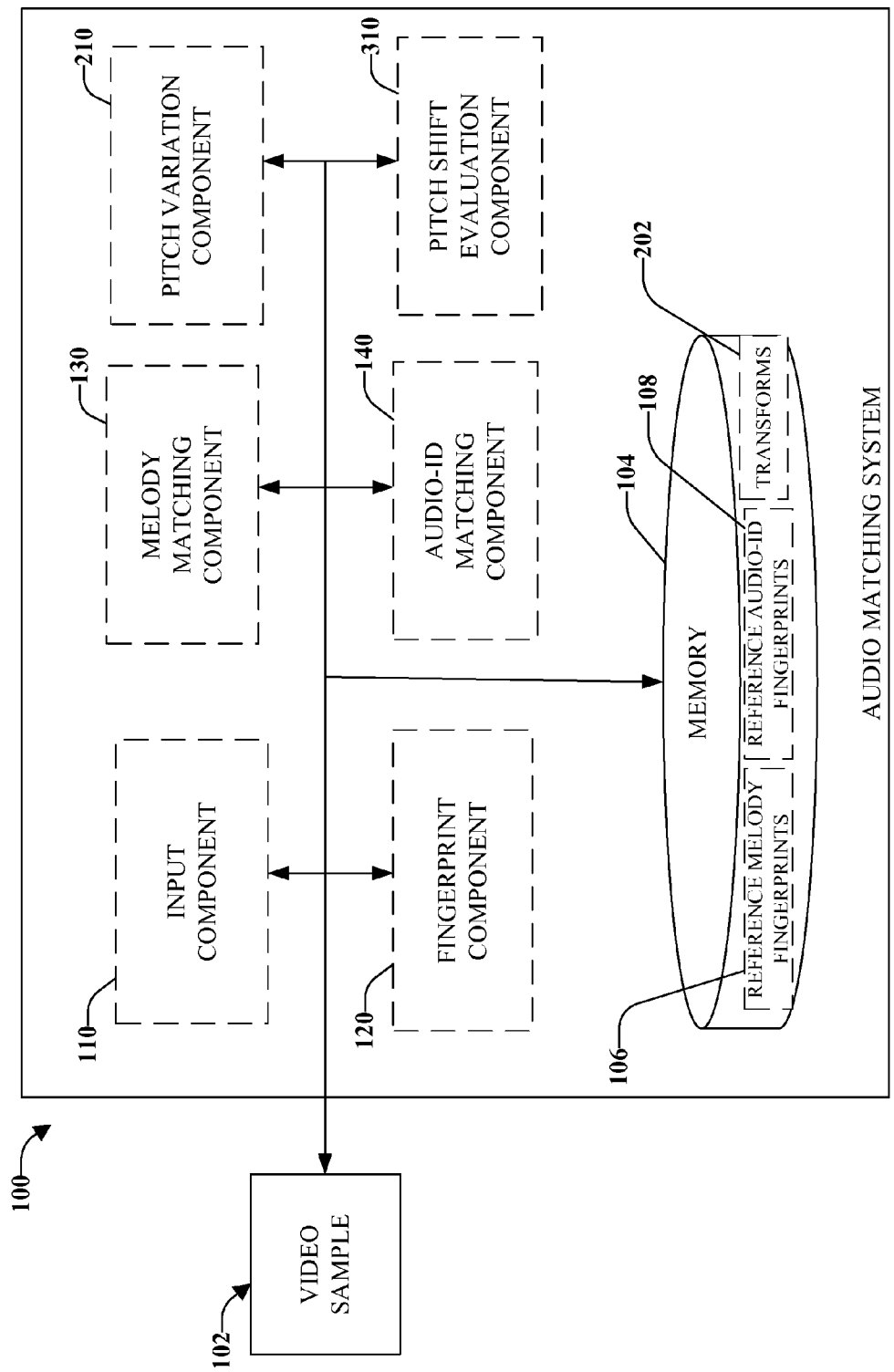
FIG. 3 illustrates a high-level functional block diagram of an example pitch shift resistant audio matching system including a pitch shift evaluation component in accordance with implementations of this disclosure.

Referring to FIG. 3, there is illustrated a high-level functional block diagram of an example pitch shift resistant audio matching system including a pitch shift evaluation component 310 in accordance with implementations of this disclosure. Pitch shift evaluation component 310 can determine an estimated amount of pitch shift between the audio track of the video sample and the set of reference audio-id fingerprints associated with the set of potential melody matches. For example, heuristics can be used to estimate the likely pitch shift transform between the audio track of video sample 102 and the reference sample associated with a reference audio-id fingerprint. It is to be appreciated that it can be assumed that the pitch shift transform can be accompanied by a proportional time stretch transform; thus, by computing the stretch factor between the matching probe duration and the reference duration, the most likely pitch transform can be computed for time stretched audio samples. For example, the duration for both the probe and the reference can be the length of the respective samples between the earliest occurring interest point and the latest occurring interest point.

In one implementation, pitch variation component 210 can generate the at least one pitch modified fingerprint based on the estimated amount of pitch shift. For example, if the estimated amount of pitch shift is 4%, the at least one pitch modified fingerprint can be generated to account for a 4% pitch shift.

Figure 4:
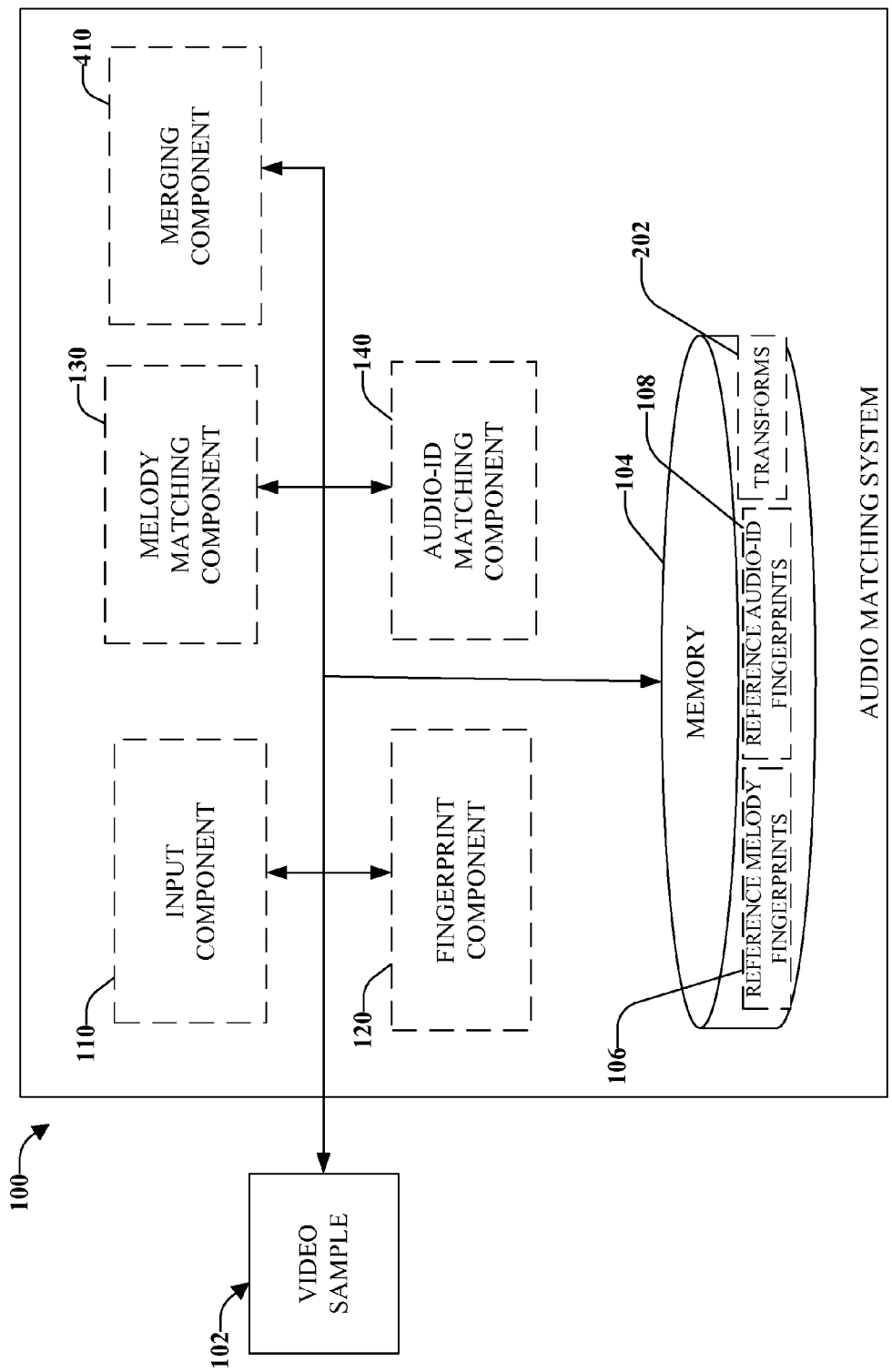
FIG. 4 illustrates a high-level functional block diagram of an example pitch shift resistant audio matching system including a merging component in accordance with implementations of this disclosure.

Referring to FIG. 4, there is illustrated a high-level functional block diagram of an example pitch shift resistant audio matching system including a merging component 410 in accordance with implementations of this disclosure. Merging component 410 can merge the set of potential melody matches and the set of potential audio-id matches to identify a set of high probability matches. For example, an audio sample that is a potential melody match to a reference sample and also a potential audio-id match to the same reference sample as well as a pitch shifted version of the same reference sample can be deemed a high probability match to the reference sample. In one implementation, the set of high probability matches does not include reference to pitch modification; thus, in the previous example, the set of high probability matches would include the reference sample but not the pitch shifted reference sample. For example, if one of the high probability matches is a reference sample "XYZ" that has been pitch modified for a −3% pitch shift, the set of high probability matches would include "XYZ" as a potential match without reference to the fact that the pitch modified version of "XYZ" was the basis for the match. In one implementation, samples can be labeled based on their pitch modification, such as "XYZ-097" for a −3% pitch shift or "XYZ-102" for a positive 2% pitch shift. It can be appreciated that by removing the suffix, e.g., the "−097" or "−102" in the previous examples, reference to pitch modification can be eliminated in the set of high probability matches. It is to be appreciated that the fact an audio sample was matched to various pitch shifted versions of a reference sample may not be transparent to a user of audio matching system 100.

FIGS. 5-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 5:
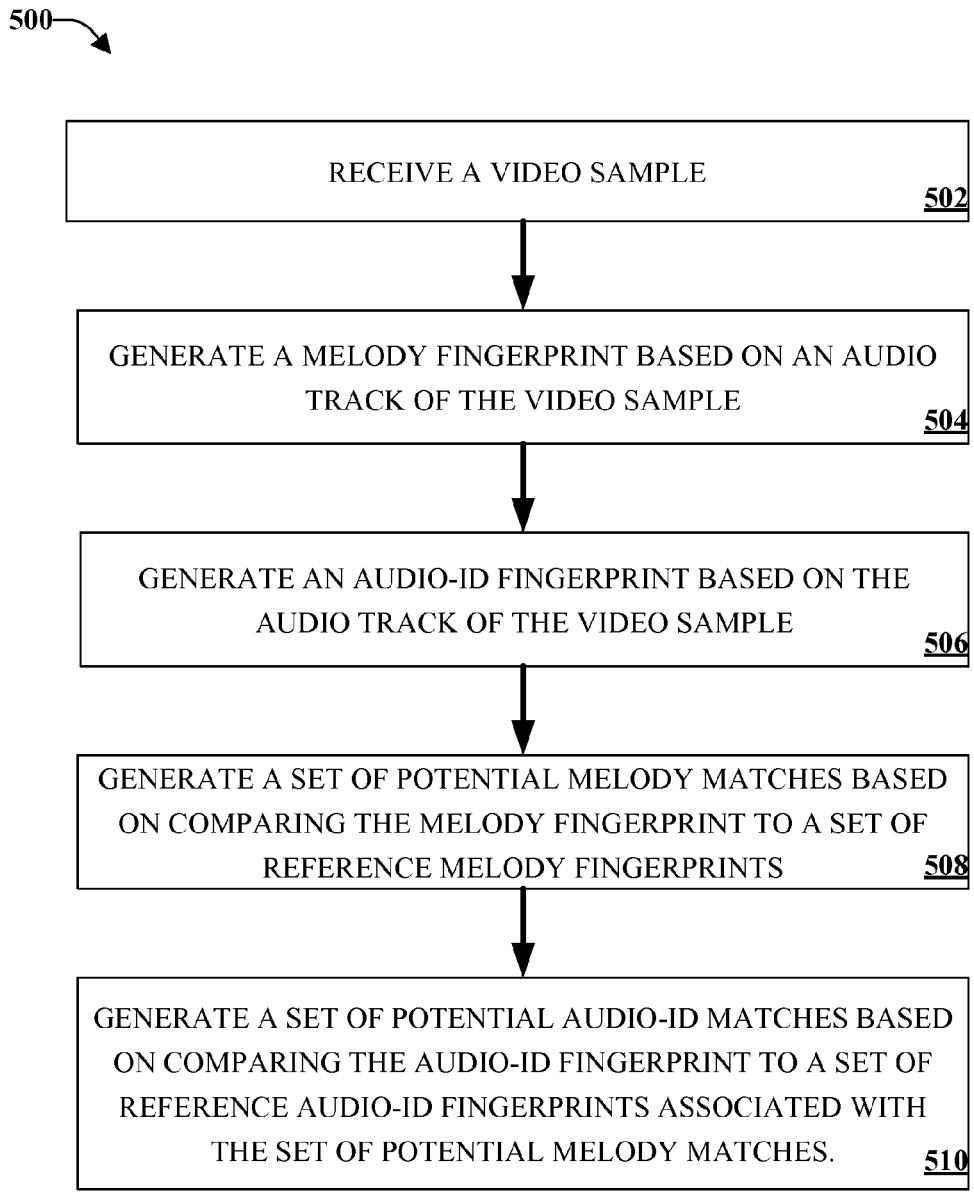
FIG. 5 illustrates an example method for pitch shift resistant audio matching in accordance with implementations of this disclosure.

FIG. 5 illustrates an example method for pitch shift resistant audio matching in accordance with implementations of this disclosure. At 502, a video sample can be received (e.g., by an input component). At 504, a melody fingerprint can be generated (e.g., by a fingerprint component) based on an audio track of the video sample. At 506, an audio-id fingerprint can be generated (e.g., by a fingerprint component) based on the audio track of the video sample. At 508, a set of potential melody matches can be generated (e.g., by a melody matching component) based on comparing the melody fingerprint to a set of reference melody fingerprints. At 510, a set of potential audio-id matches can be generated (e.g., by an audio-id matching component) based on comparing the audio-id fingerprint to a set of reference audio-id fingerprints associated with the set of potential melody matches.

Figure 6:
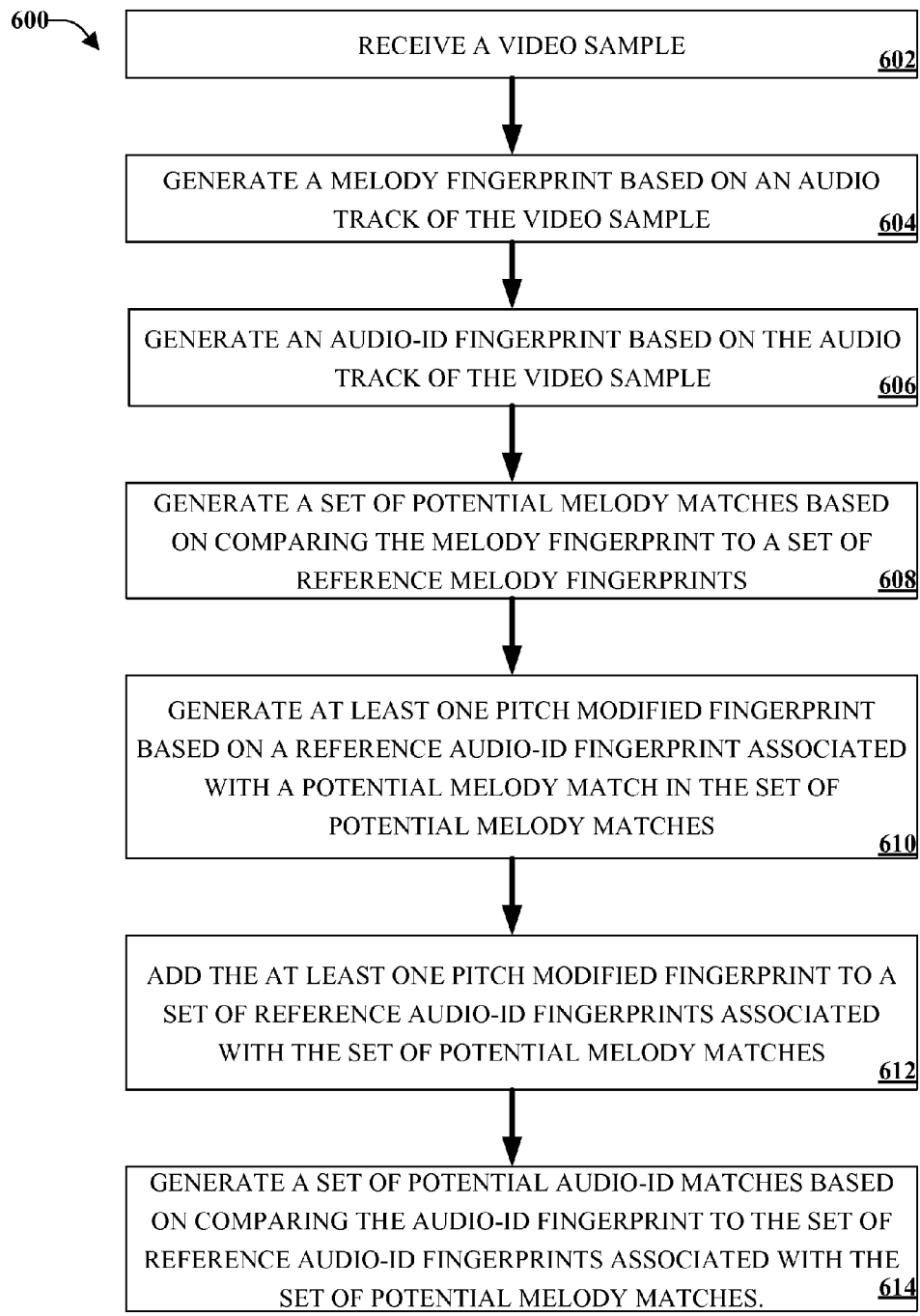
FIG. 6 illustrates an example method for pitch shift resistant audio matching including generating pitch modified fingerprints in accordance with implementations of this disclosure.

FIG. 6 illustrates an example method for pitch shift resistant audio matching including generating pitch modified fingerprints in accordance with implementations of this disclosure. At 602, a video sample can be received (e.g., by an input component). At 604, a melody fingerprint can be generated (e.g., by a fingerprint component) based on an audio track of the video sample. At 606, an audio-id fingerprint can be generated (e.g., by a fingerprint component) based on the audio track of the video sample. At 608, a set of potential melody matches can be generated (e.g., by a melody matching component) based on comparing the melody fingerprint to a set of reference melody fingerprints. At 610, at least one pitch modified fingerprint can be generated (e.g., by a pitch variation component) based on a reference audio-id fingerprint associated with a potential melody match in the set of potential melody matches. It can be appreciated that at least one pitch modified fingerprint can be generated for reference audio-id fingerprints associated with each potential melody match in the set of potential melody matches. At 612, the at least one pitch modified fingerprint can be added (e.g., by a pitch variation component) to a set of reference audio-id fingerprints associated with the set of potential matches. It is to be appreciated that the set of reference audio-id fingerprints associated with the set of potential matches can include clean audio-id fingerprints as well as the at least one pitch modified fingerprint generated at 610.

At 614, a set of potential audio-id matches can be generated (e.g., by an audio-id matching component) based on comparing the audio-id fingerprint to the set of reference audio-id fingerprints associated with the set of potential melody matches.

Figure 7:
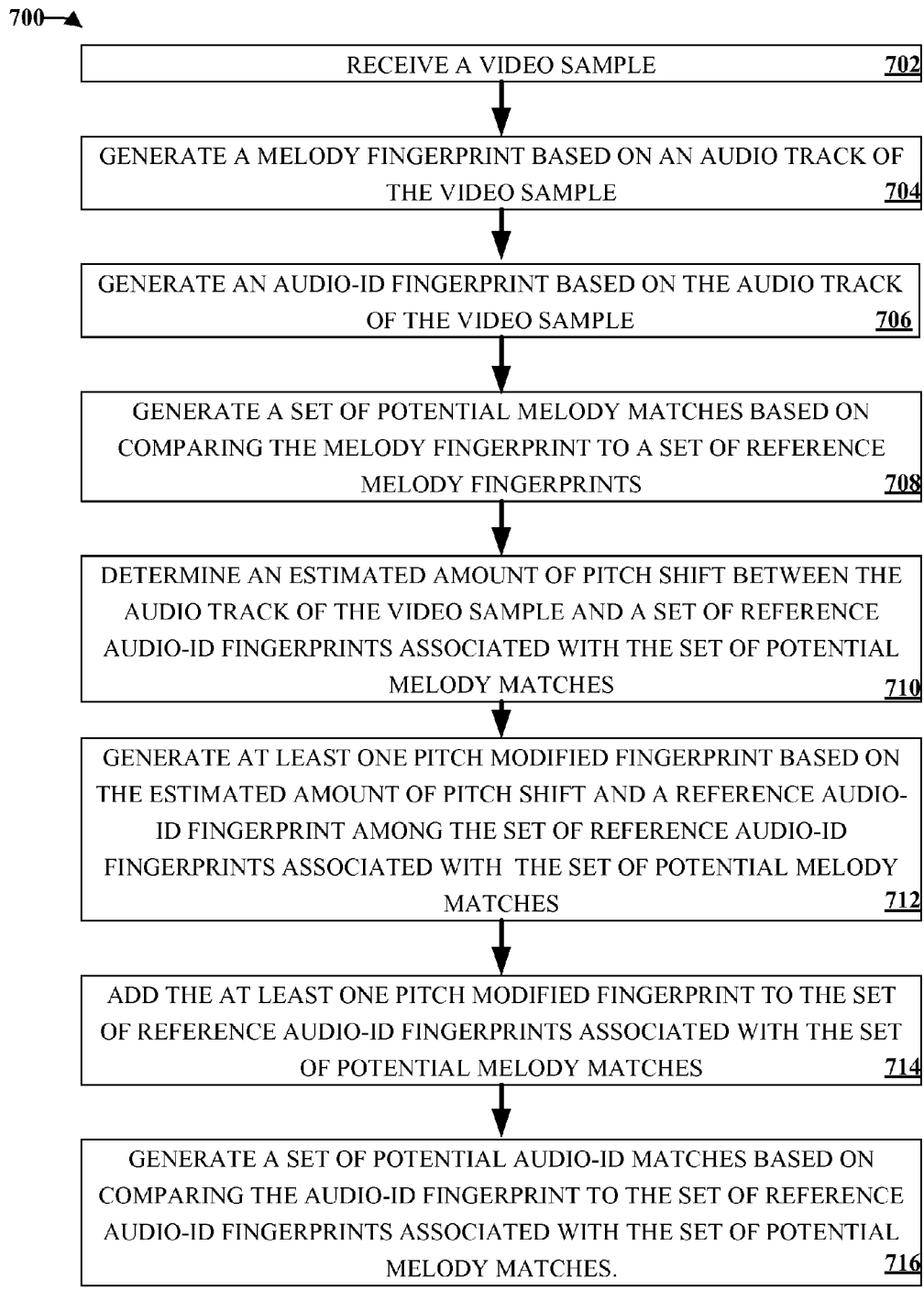
FIG. 7 illustrates an example method for pitch shift resistant audio matching including determining an estimated amount of pitch shift in accordance with implementations of this disclosure.

FIG. 7 illustrates an example method for pitch shift resistant audio matching including determining an estimated amount of pitch shift in accordance with implementations of this disclosure. At 702, a video sample can be received (e.g., by an input component). At 704, a melody fingerprint can be generated (e.g., by a fingerprint component) based on an audio track of the video sample. At 706, an audio-id fingerprint can be generated (e.g., by a fingerprint component) based on the audio track of the video sample. At 708, a set of potential melody matches can be generated (e.g., by a melody matching component) based on comparing the melody fingerprint to a set of reference melody fingerprints. At 710, an estimated amount of pitch shift between the audio track of the video sample, and the set of reference audio-id fingerprints associated with the set of potential melody matches can be determined (e.g., by a pitch shift evaluation component).

At 712, at least one pitch modified fingerprint can be generated (e.g., by a pitch variation component) based on a reference audio-id fingerprint associated with a potential melody match in the set of potential melody matches. At 714, the at least one pitch modified fingerprint can be added (e.g., by a pitch variation component) to a set of reference audio-id fingerprints associated with the set of potential matches.

At 716, a set of potential audio-id matches can be generated (e.g., by an audio-id matching component) based on comparing the audio-id fingerprint to the set of reference audio-id fingerprints associated with the set of potential melody matches.

Figure 8:
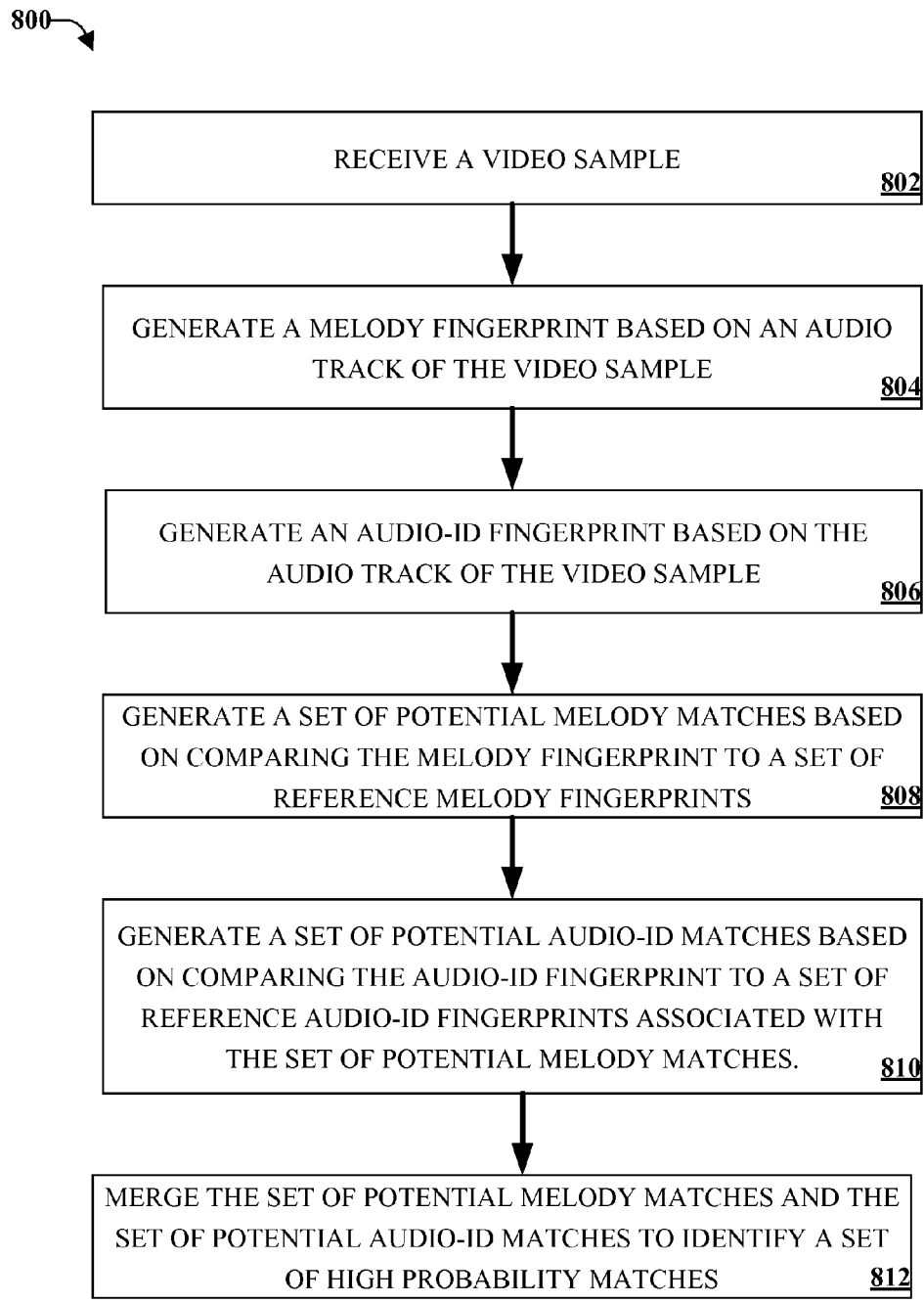
FIG. 8 illustrates an example method for pitch shift resistant audio matching including merging sets of potential matches in accordance with implementations of this disclosure.

FIG. 8 illustrates an example method for pitch shift resistant audio matching including merging sets of potential matches in accordance with implementations of this disclosure. At 802, a video sample can be received (e.g., by an input component). At 804, a melody fingerprint can be generated (e.g., by a fingerprint component) based on an audio track of the video sample. At 806, an audio-id fingerprint can be generated (e.g., by a fingerprint component) based on the audio track of the video sample. At 808, a set of potential melody matches can be generated (e.g., by a melody matching component) based on comparing the melody fingerprint to a set of reference melody fingerprints. At 810, a set of potential audio-id matches can be generated (e.g., by an audio-id matching component) based on comparing the audio-id fingerprint to a set of reference audio-id fingerprints associated with the set of potential melody matches. At 812, the set of potential melody matches and the set of potential audio-id matches can be merged (e.g., by a merging component) to identify a set of high probability matches. In one implementation, the set of high probability matches does not include reference to pitch modification.

Figure 9:
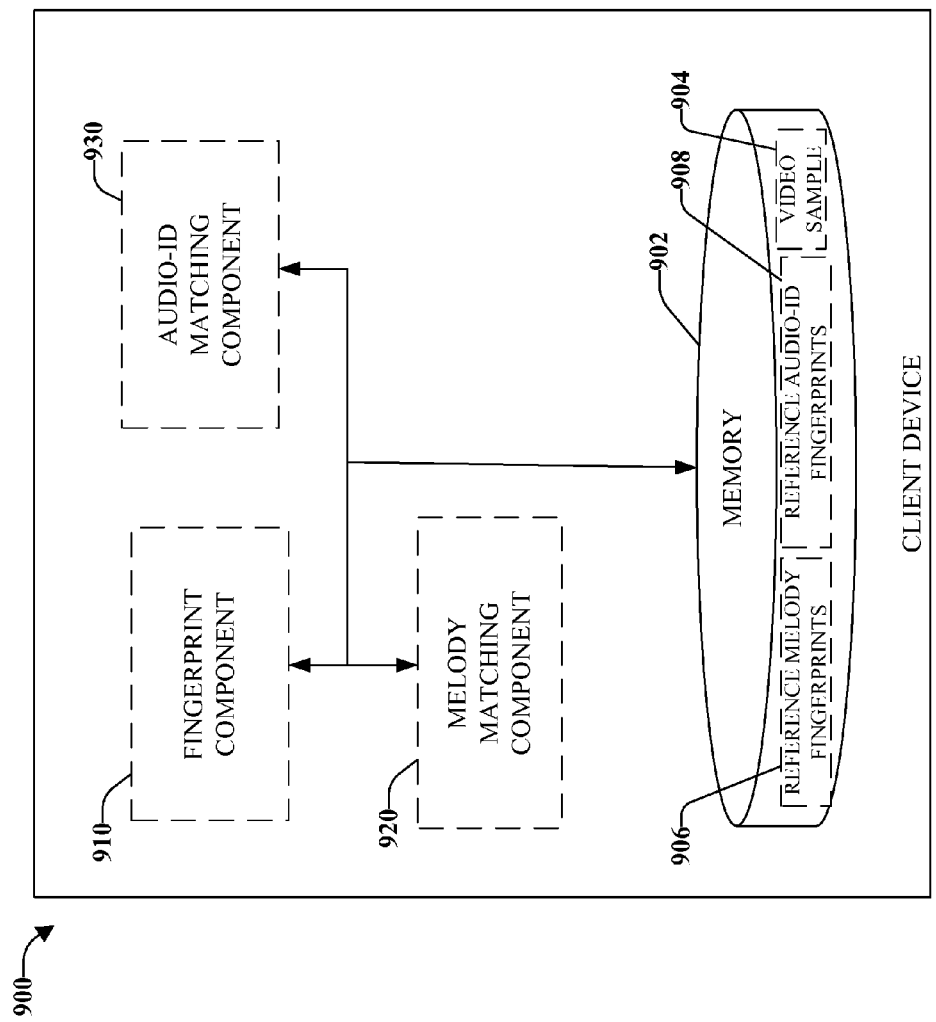
FIG. 9 illustrates a high-level functional block diagram of an example client device using pitch shift resistant audio matching in accordance with implementations of this disclosure.

FIG. 9 illustrates a high-level functional block diagram of an example client device using pitch shift resistant audio matching in accordance with implementations of this disclosure. A client device could include a smart phone, a tablet, an e-reader, a personal digital assistant, a desktop computer, a laptop computer, a server, etc. A fingerprint component 910 can generate a melody fingerprint and an audio-id fingerprint based on an audio track of a video sample 904. Video sample 904 can be stored within memory 902. It can be appreciated that the melody fingerprint and audio-id fingerprint can be generated concurrently or consecutively, in either order, by fingerprint component 910.

A melody matching component 920 can identify a set of potential melody matches based on comparing the melody fingerprint to a set of reference melody fingerprints 906. In one implementation, the set of reference melody fingerprints 906 can be stored remotely from the client device, e.g., in a separate data store, accessible via a server, or in the cloud. For example, reference melody fingerprints 906 can be a set of reference melody fingerprints previously generated and indexed based on a set of reference samples. It is to be appreciated that reference melody fingerprints 906 can be indexed in variety of available formats, such as using a hash index, allowing for efficient use by melody matching component 920 in identifying a set of potential melody matches.

An audio-id matching component 930 can identify a set of potential audio-id matches based on comparing the audio-id fingerprint to a set of reference audio-id fingerprints 908 associated with the set of potential melody matches. In one implementation, the set of reference audio-id fingerprints 908 can be stored remotely from the client device, e.g., in a separate data store, accessible via a server, or in the cloud. For example, reference audio-id fingerprints 908 can be a set of reference audio-id fingerprints previously generated and indexed based on a set of reference samples. Reference audio-id fingerprints 908 can be associated with corresponding reference melody fingerprints 906 associated with the same reference sample. Thus, the set of potential melody matches identified by melody matching component 920 can be associated with a set of audio-id fingerprints based on the same underlying reference samples. It is to be appreciated that reference audio-id fingerprints 908 can be indexed in variety of available formats, such as using a hash index, allowing for efficient use by audio-id matching component 930 in identifying a set of potential audio-id matches.

Figure 10:
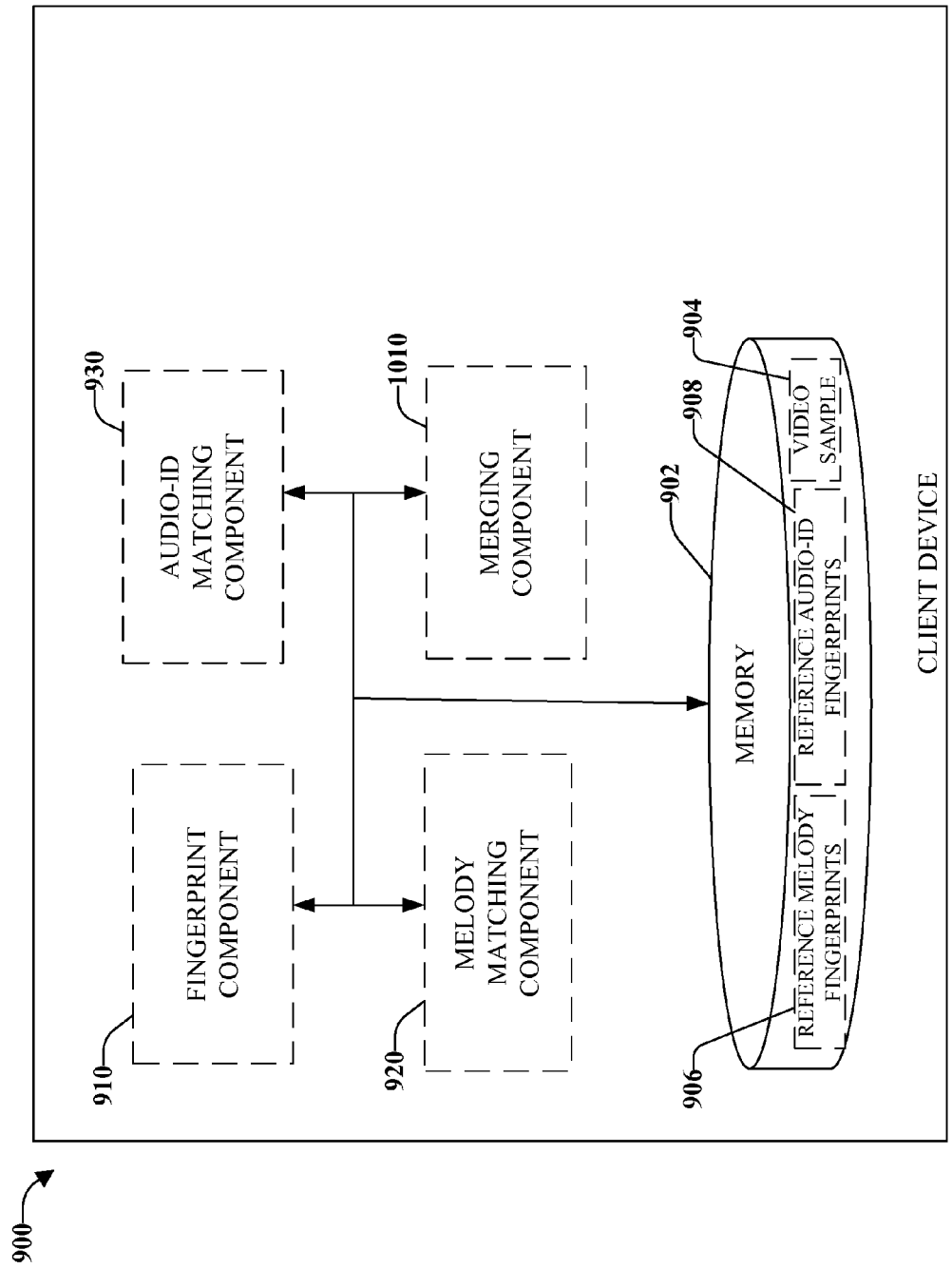
FIG. 10 illustrates a high-level functional block diagram of an example client device using pitch shift resistant audio matching including a merging component in accordance with implementations of this disclosure.

FIG. 10 illustrates a high-level functional block diagram of an example client device using pitch shift resistant audio matching including a merging component 1010 in accordance with implementations of this disclosure. Merging component 1110 can merge the set of potential melody matches and the set of potential audio-id matches to identify a set of high probability matches. For example, an audio sample that is a potential melody match to a reference sample and also a potential audio-id match to the same reference sample as well as a pitch shifted version of the same reference sample can be deemed a high probability match to the reference sample. In one implementation, the set of high probability matches does not include reference to pitch modification, thus, in the previous example, the set of high probability matches would include the reference sample but not the pitch shifted reference sample. It is to be appreciated that the fact an audio sample was matched to various pitch shifted versions of a reference sample need not be transparent to a user of audio matching system 900.

Figure 11:
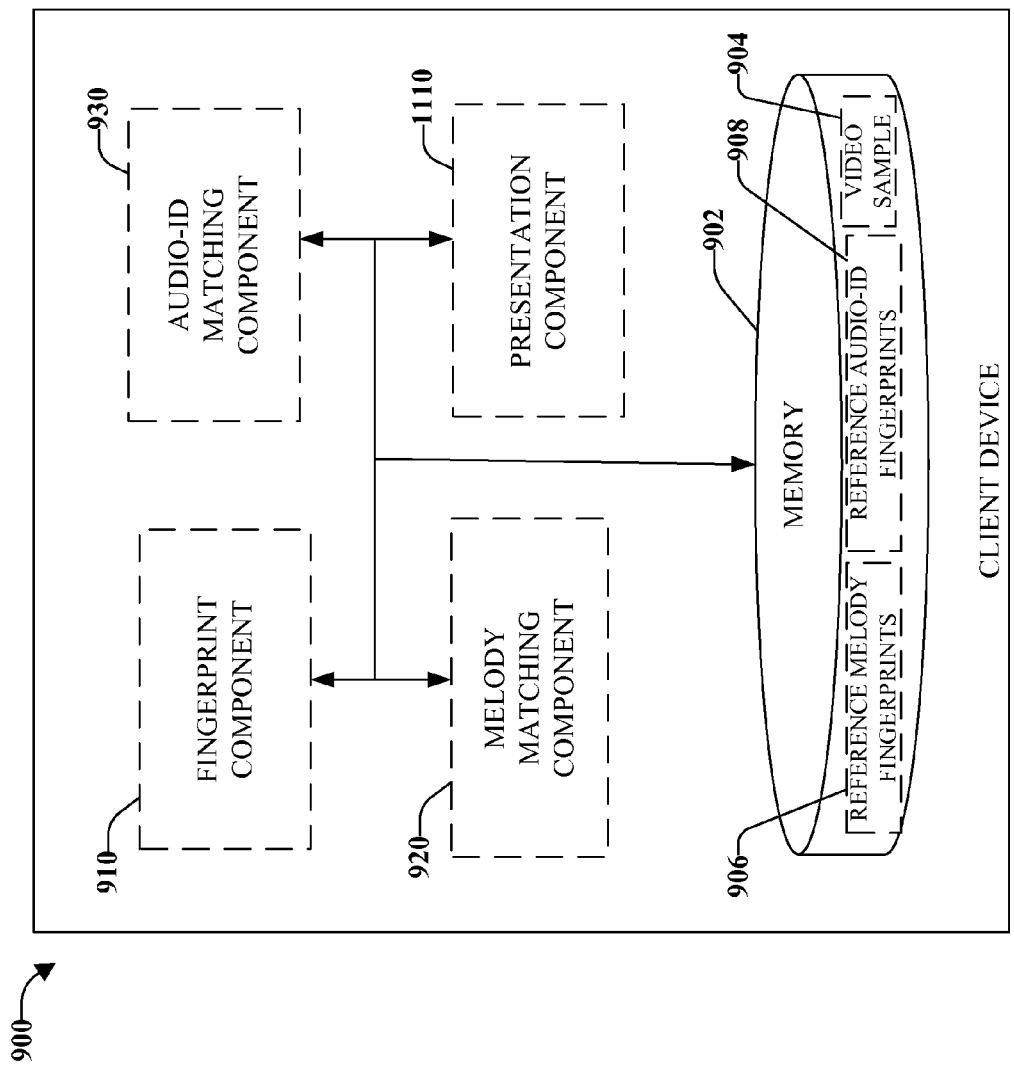
FIG. 11 illustrates a high-level functional block diagram of an example client device using pitch shift resistant audio matching including a presentation component in accordance with implementations of this disclosure.

FIG. 11 illustrates a high-level functional block diagram of an example client device using pitch shift resistant audio matching including a presentation component 1110 in accordance with implementations of this disclosure. Presentation component 1110 can display identification of the set of high probability matches. For example, presentation component 1110 can display metadata associated with the set of high probability matches on the client device, wherein the metadata can include an author, an album, an artist, a film, a release date, a genre, etc. Presentation component can identify that the displayed metadata is associated with the video sample, by, for example, displaying the name and/or storage location within 902 of the video sample.

Figure 12:
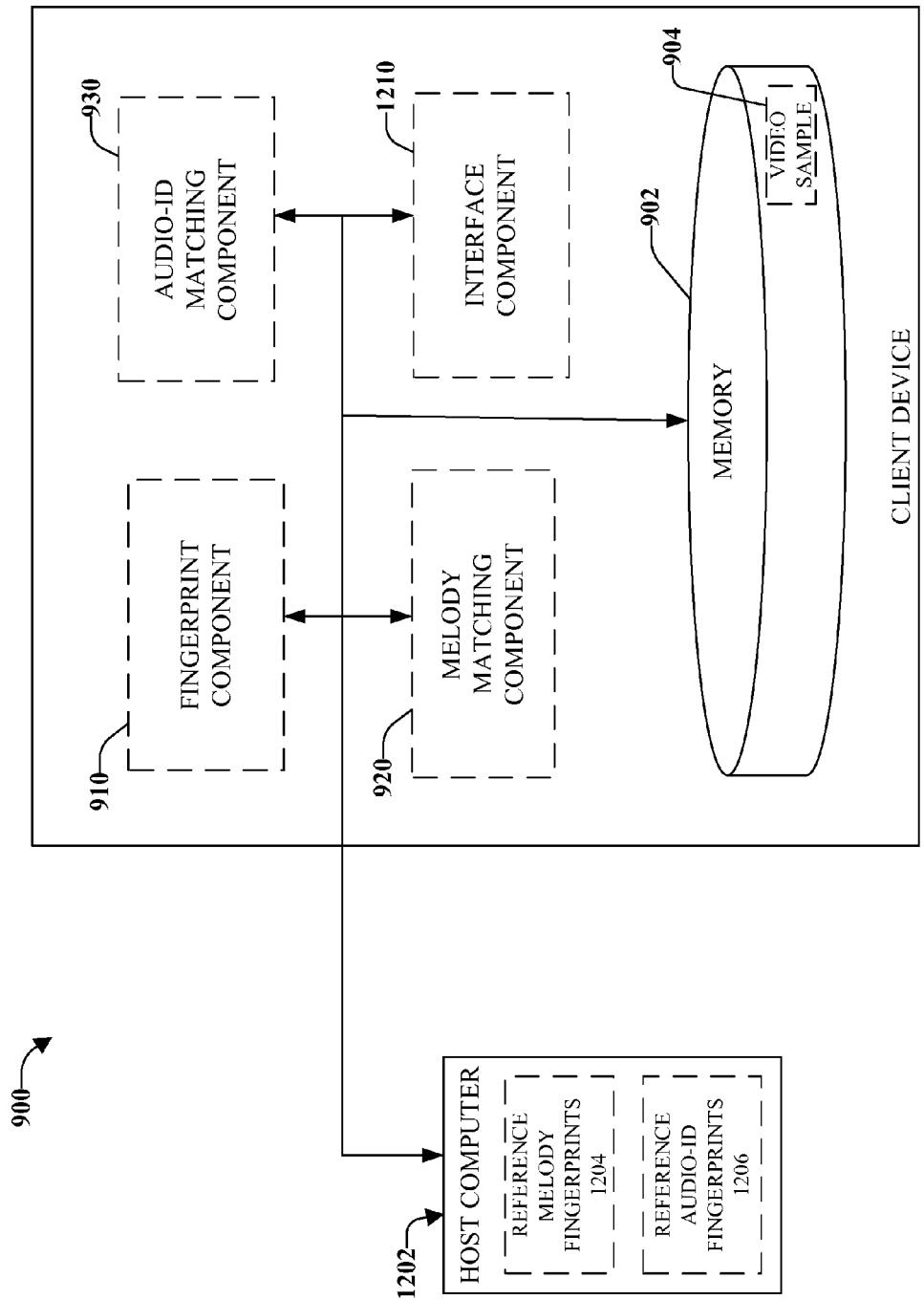
FIG. 12 illustrates a high-level functional block diagram of an example client device using pitch shift resistant audio matching including an interface component in accordance with implementations of this disclosure.

FIG. 12 illustrates a high-level functional block diagram of an example client device using pitch shift resistant audio matching including an interface component 1210 in accordance with implementations of this disclosure. Interface component 1210 can communicatively couple the melody matching component to a set of reference melody fingerprints 1204 and the audio-id matching component to a set of reference audio-id fingerprints 1206, wherein the set of reference melody fingerprints 1204 and the set of reference audio-id fingerprints 1206 are located at a host computer 1202. For example, host computer 1202 can be a node in a cloud computing service storing information accessible by interface component 1210 or alternatively, capable of processing information based on instruction received from interface component 1210.

In one implementation, melody matching component 920 can identify a set of potential melody matches by transmitting the melody fingerprint to the host computer 1202, wherein the host computer 1202 can employ the melody fingerprint to identify a set of potential melody matches based on comparing the melody fingerprint to the set of reference melody fingerprints 1204.

In one implementation, audio-id matching component 930 can identify a set of potential audio-id matches by transmitting the audio-id fingerprint to the host computer 1202, wherein the host computer 1202 can employ the audio-id fingerprint to identify a set of potential audio-id matches based on comparing the audio-id fingerprint to the set of reference audio-id fingerprints 1206 associated with the set of potential melody matches. It can be appreciated that host computer 1202 can utilize pitch modified audio-id fingerprints associated with the set of potential melody matches generated by and stored within host computer 1202 in identifying a set of potential audio-id matches. For example, host computer 1202 can include/use a pitch variation component 210 and a pitch shift evaluation component 310 as more fully described with respect to FIGS. 2 and 3 respectively, to generate and store pitch modified audio-id fingerprints.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 13:
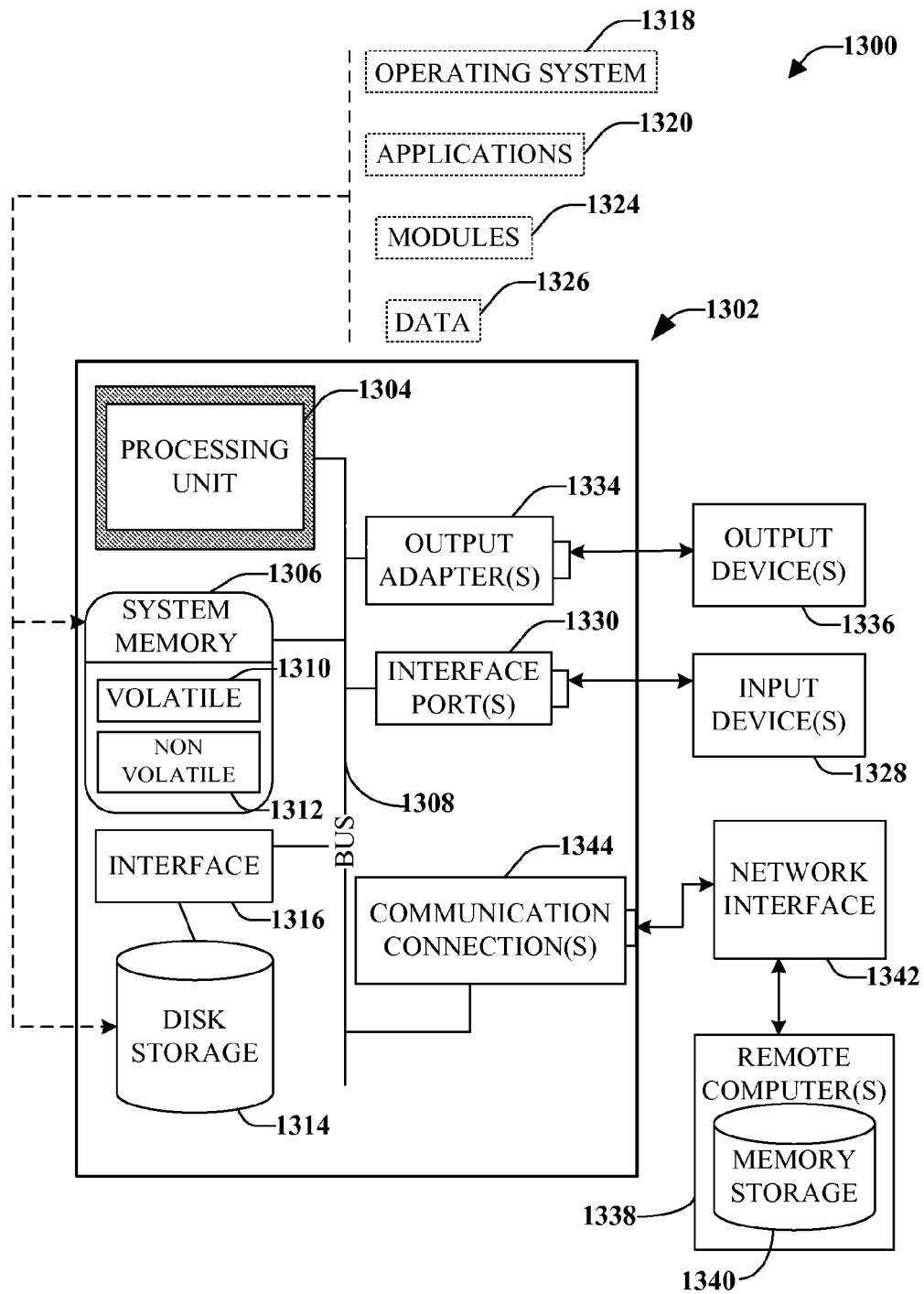
FIG. 13 illustrates an example block diagram of a computer operable to execute the disclosed architecture in accordance with implementations of this disclosure.

With reference to FIG. 13, a suitable environment 1300 for implementing various aspects of the claimed subject matter includes a computer 1302. It is to be appreciated that the computer, 1302 can be used in connection with implementing one or more of the systems or components shown and described in connection with FIGS. 1-4. The computer 1302 includes a processing unit 1304, a system memory 1306, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 1302 may also include removable/non-removable, volatile/non-volatile computer storage media. FIG. 13 illustrates, for example, a disk storage 1314. Disk storage 1314 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1314 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302, and to output information from computer 1302 to an output device 1336.

Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
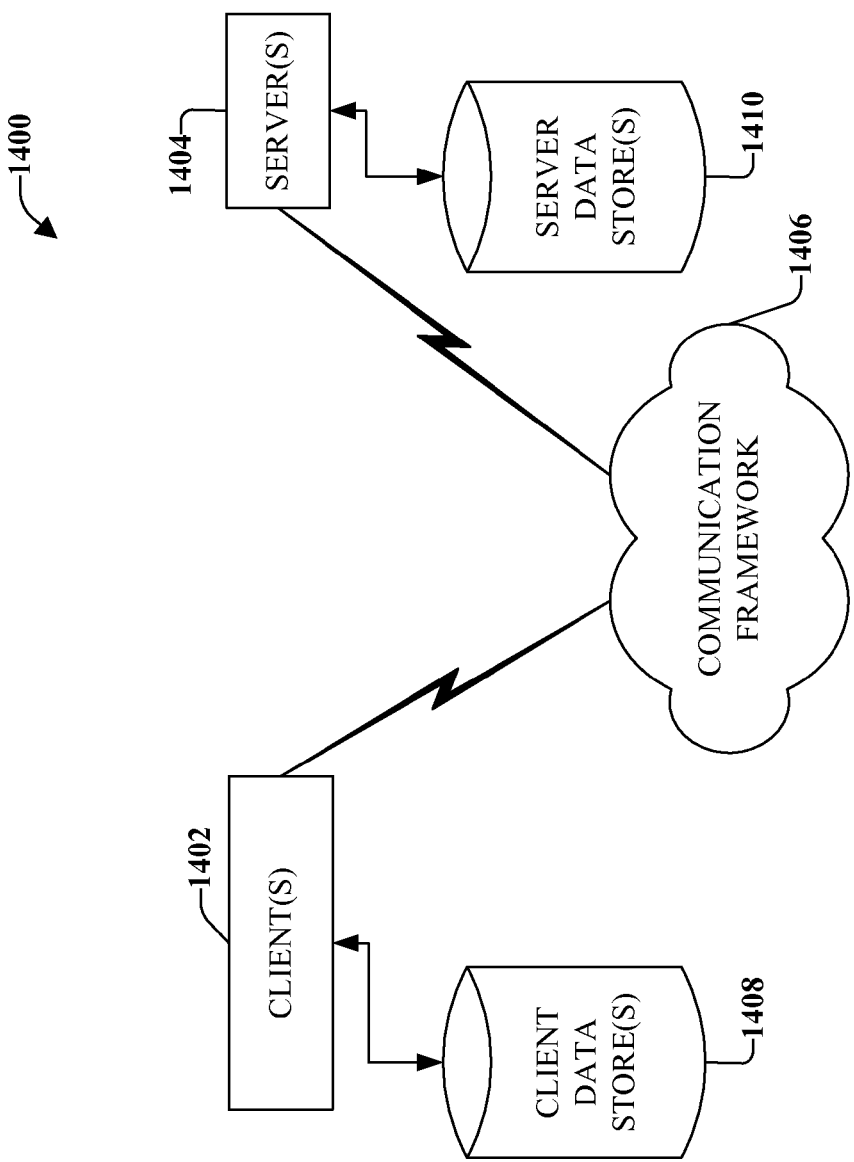
FIG. 14 illustrates an example schematic block diagram for a computing environment in accordance with implementations of this disclosure.

Referring now to FIG. 14, there is illustrated a schematic block diagram of a computing environment 1400 in accordance with the subject specification. The system 1400 includes one or more client(s) 1402, which can include an application or a system that accesses a service on the server 1404. The client(s) 1402 can be hardware and/or software (e.g., threads, processes, computing devices). The client(s) 1402 can house cookie(s), metadata, and/or associated contextual information and can also house threads to perform, for example, receiving an video sample, generating a spectrogram, identifying interest points of a spectrogram, generating melody fingerprints, generating audio-id fingerprints, generating pitch-shifted audio samples, determining an amount of pitch shifting, merging matches, etc. in accordance with the subject disclosure.

The system 1400 also includes one or more server(s) 1404. The server(s) 1404 can also be hardware or hardware in combination with software (e.g., threads, processes, computing devices). The servers 1404 can house threads to perform, for example, receiving an video sample, generating a spectrogram, identifying interest points of a spectrogram, generating melody fingerprints, generating audio-id fingerprints, generating pitch-shifted audio samples, determining an amount of pitch shifting, merging matches, etc. in accordance with the subject disclosure. One possible communication between a client 1402 and a server 1404 can be in the form of a data packet adapted to be transmitted between two or more computer processes where the data packet contains, for example, an audio sample or descriptors associated with an audio sample. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
   a memory that has stored thereon computer executable components; and
   a processor that executes the following computer executable components stored in the memory:

an input component that receives a video sample;
a fingerprint component that generates a melody fingerprint and an audio-id fingerprint based on an audio track of the video sample;
a melody matching component that identifies a set of potential audio matches for the audio track based on comparing the melody fingerprint to reference melody fingerprints for the potential audio matches of the set;
an audio-id matching component that identifies reference audio-id fingerprints respectively associated with the potential audio matches of the set;
a pitch shift evaluation component that determines an estimated amount of pitch shift between the audio track and the reference audio-id fingerprints; and
a pitch variation component that generates sets of pitch modified fingerprints for each of the reference audio-id fingerprints based on the estimated amount of pitch shift,
wherein the audio-id matching component identifies a subset of the set of the potential audio matches based on comparing the audio-id fingerprint to the reference audio-id fingerprints and the sets of the pitch modified fingerprints.

2. The system of claim 1, wherein the pitch variation component generates the sets of the pitch modified fingerprint based on pitch shift resistance thresholds respectively associated with the reference audio-id fingerprints.

3. The system of claim 1, further comprising:
a merging component that identifies a pitch modified fingerprint, included in a set of the sets of pitch modified fingerprints, that has a high matching probability with the audio-id fingerprint relative to the reference audio-id fingerprints and other ones of the pitch modified fingerprints.

4. The system of claim 3, wherein the merging component identifies an audio match included in the subset of the set of potential audio matches that corresponds to the pitch modified fingerprint.

5. A method, comprising:
using a processor to execute computer executable components stored on a computer readable medium to perform the following acts:
receiving a video sample;
generating a melody fingerprint based on an audio track of the video sample;
generating an audio-id fingerprint based on the audio track of the video sample
identifying a set of potential audio matches for the audio track based on comparing the melody fingerprint to reference melody fingerprints for the potential audio matches of the set;
identifying a set of reference audio-id fingerprints respectively associated with the potential audio matches of the set;
determining an estimated amount of pitch shift between the audio track and the reference audio-id fingerprints;
generating sets of pitch modified fingerprints for each of the reference audio-id fingerprints based on the estimated amount of pitch shift; and
identifying a subset of the set of the potential audio-id matches based on comparing the audio-id fingerprint to the reference audio-id fingerprints and the sets of the pitch modified fingerprints.

6. The method of claim 5, wherein generating the sets of the pitch modified fingerprints is based on pitch shift resistance thresholds respectively associated with the reference audio-id fingerprints.

7. The method of claim 5, further comprising:
identifying a pitch modified fingerprint, included in a set of the sets of pitch modified fingerprints, that has a high matching probability with the audio-id fingerprint relative to the reference audio-id fingerprints and other ones of the pitch modified fingerprints.

8. The method of claim 7, further comprising:
identifying an audio match included in the subset of the set of potential audio matches that corresponds to the pitch modified fingerprint.

9. The system of claim 1, wherein the melody fingerprint comprises a first set of interest points that correspond to a melody of the audio track and the audio-id fingerprint comprises a second set of interest points that correspond to unique audio characteristics of the audio track, the reference melody fingerprints respectively comprise first sets of interest points that respectively correspond to melodies of the potential audio matches of the set, and the reference audio-id fingerprints respectively comprise second sets of interest points that respectively correspond to unique audio characteristics of the potential audio matches of the set.

10. The method of claim 5, wherein the melody fingerprint comprises a first set of interest points that correspond to a melody of the audio track and the audio-id fingerprint comprises a second set of interest points that correspond to unique audio characteristics of the audio track, the reference melody fingerprints respectively comprise first sets of interest points that respectively correspond to melodies of the potential audio matches of the set, and the reference audio-id fingerprints respectively comprise second sets of interest points that respectively correspond to unique audio characteristics of the potential audio matches of the set.

11. A tangible computer-readable storage medium comprising computer-readable instructions that, in response to execution, cause a computing system to perform operations, comprising:
receiving, from a device, a melody fingerprint and an audio-id fingerprint associated with an audio track;
identifying a set of potential audio matches for the audio track based on comparing the melody fingerprint to reference melody fingerprints for the potential audio matches of the set;
identifying a set of reference audio-id fingerprints respectively associated with the potential audio matches of the set;
determining an estimated amount of pitch shift between the audio track and the reference audio-id fingerprints;
generating sets of pitch modified fingerprints for each of the reference audio-id fingerprints based on the estimated amount of pitch shift; and
identifying a subset of the set of the potential audio-id matches based on comparing the audio-id fingerprint to the reference audio-id fingerprints and the sets of the pitch modified fingerprints.

12. The tangible computer-readable storage medium of claim 11, wherein generating the sets of the pitch modified fingerprints is based on pitch shift resistance thresholds respectively associated with the reference audio-id fingerprints.

13. The tangible computer-readable storage medium of claim 11, the operations further comprising:
identifying a pitch modified fingerprint, included in a set of the sets of pitch modified fingerprints, that has a high matching probability with the audio-id fingerprint relative to the reference audio-id fingerprints and other ones of the pitch modified fingerprints; and identifying an audio match included in the subset of the set of potential audio matches that corresponds to the pitch modified fingerprint.

14. The tangible computer-readable storage medium of claim 11, the operations further comprising:

sending information identifying the audio match to the device.

15. The tangible computer-readable storage medium of claim 11, wherein the melody fingerprint comprises a first set of interest points that correspond to a melody of the audio track and the audio-id fingerprint comprises a second set of interest points that correspond to unique audio characteristics of the audio track, the reference melody fingerprints respectively comprise first sets of interest points that respectively correspond to melodies of the potential audio matches of the set, and the reference audio-id fingerprints respectively comprise second sets of interest points that respectively correspond to unique audio characteristics of the potential audio matches of the set.

* * * * *